Sept. 21, 1926.
E. B. SYMONS
GYRATORY CRUSHER
Filed May 17, 1924 2 Sheets-Sheet 1
1,600,780
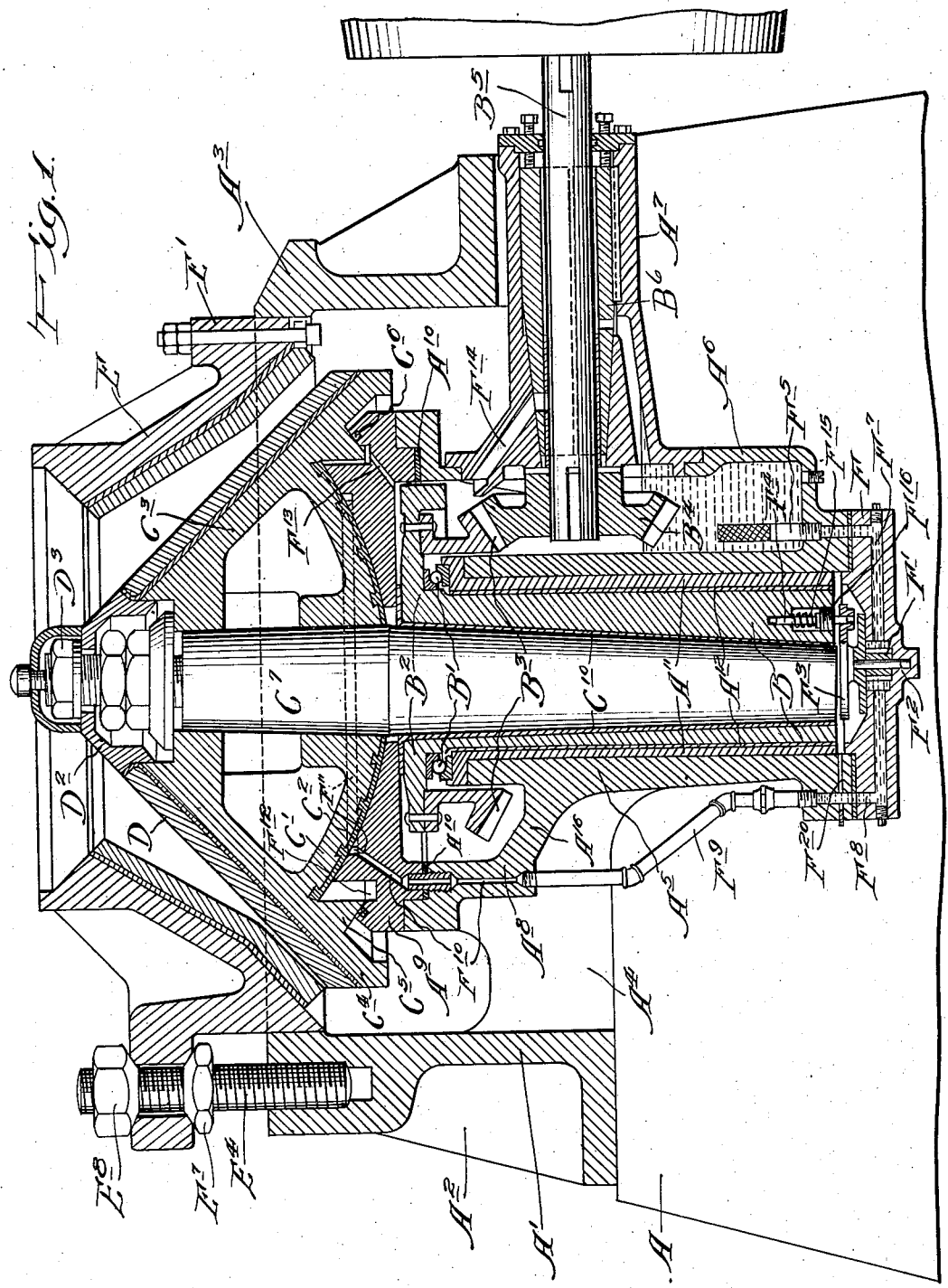
Inventor:
Edgar B. Symons
by
Att'ys

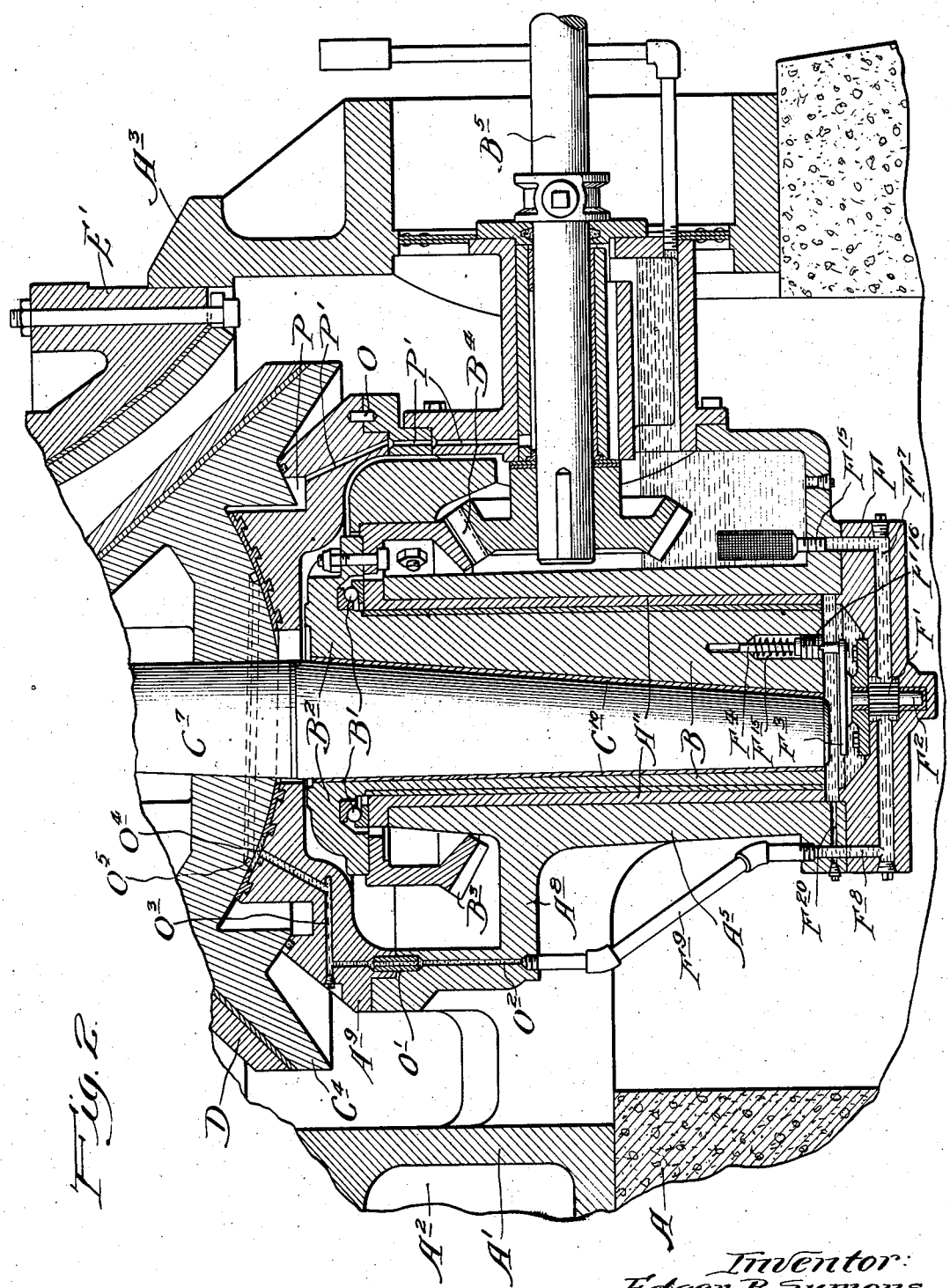

Patented Sept. 21, 1926.

1,600,780

UNITED STATES PATENT OFFICE.

EDGAR B. SYMONS, OF HOLLYWOOD, CALIFORNIA, ASSIGNOR TO SYMONS BROTHERS COMPANY, OF BAKERSFIELD, CALIFORNIA, A CORPORATION OF SOUTH DAKOTA.

GYRATORY CRUSHER.

Application filed May 17, 1924. Serial No. 713,877.

My invention relates to improvements in a gyratory stone crushing machine, and has for one object to provide an improved lubricating means for such a crusher. Other objects will appear from time to time in the course of the specification and claims.

I illustrate my invention more or less diagrammatically in the accompanying drawings, wherein—

Figure 1 is a vertical section through the machine;

Figure 2 is a similar section of a modified form.

Like parts are illustrated by like characters throughout the specification and claims.

A is a bed upon which rests a frame $A^1$ outwardly flanged as at $A^2$ for stiffness, and provided at its top with a reinforcing flange $A^3$. $A^4$, $A^4$ are radial arms extending inwardly from the flange $A^1$ to support a rigid bearing sleeve $A^5$. One side of this bearing sleeve carries a gear case $A^6$ from which projects laterally the horizontal sleeve $A^7$. The sleeve $A^5$ terminates in a gear case $A^{16}$ at its upper end, which is formed by a flange $A^8$ projecting outwardly from the base of the sleeve $A^5$, and is closed by the bearing cap $A^9$, there being an oil tight packing $A^{10}$ between this cap and the top of the sleeve $A^5$. The sleeve $A^5$ is provided with a tightly fitting lining $A^{11}$.

B is an eccentric sleeve mounted for rotation in the bearing and having an outer babbitted bearing $A^{12}$. It is flanged as at $B^2$ and has an annular ball bearing $B^1$ resting upon the upper flange of the lining $A^{11}$ to support the downward thrust caused by the weight of the eccentric and its associated parts. $B^3$ is a ring gear secured to the underside of the flange $B^2$ surrounding the upper end of the bearing $A^3$ and located within the gear case $A^{16}$. $B^4$ is a bevel pinion in mesh with the gear $B^3$ mounted on the drive shaft $B^5$.

The bearing cap $A^9$ is formed with an upper spherical bearing surface which supports a segmental ball member $C^1$ having a Babbitt facing $C^2$ to engage the spherical bearing surface. $C^3$ is a crushing head or cone mounted upon and integral with said segmental ball member, and is provided with a skirt $C^4$ extending downwardly below the spherical bearing surface, and is provided immediately below the bearing governed by the standard with a flange $C^5$, having a spherical surface concentric with the spherical bearing surface, engaging an oil packing ring $C^6$ in the lower or outer spherical surface of the cap $A^9$, which surface is also concentric with the ball bearing. $C^7$ is a shaft mounted in the cone and extending down through the cap $A^9$, making a close fit with the Babbitt surface $C^{10}$ on the inside of the eccentric sleeve B.

D is a conical mantle of manganese steel or other suitable material carried on the cone, and secured, for example, by the conic plug $D^2$ and the nut $D^3$.

E is a conical spider having a cylindrical flange $E^1$ adapted to penetrate and be vertically adjustable in relation to the frame $A^1$, for example by the fixed adjusting screws $E^4$ and the adjusting nuts $E^7$, $E^8$.

F is a pump housing closing the lower end of the sleeve $A^5$. $F^1$ is a gear pump carried thereby and mounted on a shaft $F^2$. $F^3$ is a crank disc rigidly attached to the gear pump and having an aperture adapted to be engaged by a crank pin $F^4$ which is thrust downwardly toward the disc by means of a spring $F^{15}$. In arranging this part of the apparatus the plug $F^{16}$ is screw threaded into a hole in the end of the eccentric and a collar on the crank pin $F^4$ rests against this plug to prevent the spring $F^{15}$ from throwing the plug out too far. The relative position of plug and collar is such that the crank pin can go down far enough to engage the hole in the crank disc. Taking the position shown in Figure 1, when the crank disc is put in place, the crank pin rides on the disc, the spring being under compression. As soon as rotation begins, the eccentric rotates until the crank pin is in line with the hole in the disc, when the spring forces the pin into the hole, and from then on the crank pin is in the hole in the crank disc. $F^5$ is an oil pipe extending from a point above the bottom of the chamber $F^6$ through the conduit $F^7$ to the pump. Oil is discharged thence through the conduit $F^8$, pipe $F^9$ and conduit $F^{10}$ to the annular conduit $F^{11}$ cut in the spherical bearing surface of the cap $A^9$ by which the ball and socket bearing is lubricated. Oil passes out into the annular chamber $F^{12}$ from the ball and socket bearing, whence it drains through the conduit $F^{13}$ into the gear chamber, and thus back to the oil well. Some of this oil will pass through the conduit $F^{14}$ to lubricate the bearing $B^6$. $F^{20}$ is an oil duct extending, as shown in Figure 1, from the oil conduit $F^8$ to the chamber beneath the eccentric and the main crusher shaft in which is located the crank disc $F^3$. Oil passes through this duct $F^{20}$ to fill this chamber and in response to the action of the pump $F^1$. Since the cross sectional area of the passage $F^{20}$ is very materially smaller than the cross sectional area of the conduit $F^8$, it receives small proportion of the delivery of the pump, but sufficient to maintain the feed chamber full of oil and to force oil upwardly between the main crusher shaft and the eccentric B, and between the eccentric B and the sleeve or bearing $A^{11}$. The oil which thus passes upwardly about the crusher shaft and eccentric finds its way either over the top of the eccentric or out through the ball bearings $B^1$ and finally flows back to the oil chamber $F^6$. There is thus a complete circulation of oil through all of the bearings and the oil chamber being completely closed and, there being no rotating packing employed, lubrication troubles will be reduced to a minimum In the variation shown in Figure 2, O, $O^1$ are holding pins projecting upwardly from the part $A^8$ and adapted to penetrate into the cap $A^9$ to prevent its rotating with the ball or head. These pins are irregularly spaced to permit the parts to be assembled only in a certain predetermined angular relation. One of the pins $O^1$ is hollow and is used to continue the conduit or pipe $F^9$ through which oil is fed into the bearing surface between the ball and its socket. The oil path is through the pipe $F^9$, the passage $O^2$, the pin $O^1$ and the passage $O^3$ to the surface of the ball where it discharges into a relatively open space $O^4$ which communicates with an annular groove $O^5$ extending clear around the ball face. Thus oil is fed under pressure to this channel all the way around the spherical bearing, and as the ball oscillates or gyrates the oil will work both outwardly and inwardly to lubricate the opposed spherical surfaces. In the modified form of Figure 2, the oil discharged into the annular sump P is fed through the passage $P^1$ to oil the counter shaft bearing, flowing thence to the main oil well.

It will be realized that while I have illustrated a fully operative device, nevertheless many changes might be made in size, proportion and disposition of parts and in variations of detail and arrangement of conduits without departing from the spirit of my invention, and I wish my description and drawings to be taken as in a broad sense illustrative, rather than as a limitation to the specific device shown.

The use and operation of my invention are as follows:

When the crusher is set up as shown in the drawings, the drive shaft $B^5$ is rotated, causing the eccentrically apertured sleeve B to gyrate or wabble, carrying with it the crushing shaft and gyrating the crusher head upon its large spherical bearing. The material to be crushed is fed in from above, falling freely under the influence of gravity into the crushing space between the concave and cone. The packing ring immediately beneath the apron and extending out from the face of the cone prevents any escape of oil. However, there is practically no tendency of the oil to escape, since it would have to flow upwardly, there being no rotating or moving parts likely to pump oil out through any of the oil packings.

In order to obtain a proper circulation of oil through the system and properly to lubricate the bearing parts, I provide a main oil reservoir or sump, whence a filter and a passage leads to a rotary pump. The pump is rotated in response to the rotation of the eccentric sleeve, the disc $F^3$ being engaged by the crank pin $F^4$ which is yieldingly thrust downwardly from the eccentric and into the disc.

The oil thus positively pumped passes through the conduits $F^8$, $F^9$ upwardly to the spherical bearing surface. In the form shown in Figure 1 it is conducted about the spherical surface by means of an annular oil duct. As the head gyrates back and forth some of the oil escapes to the surrounding annular sump and some passes downwardly through the central aperture of the supporting cap. In either case it passes to the gear case whither the passage $F^{13}$ leads from the annular sump. The passage $F^{14}$ leads some of the oil from the gear case to lubricate the bearing for the shaft $B^5$.

In the form shown in Figure 2 the oil passes to a relatively extended pocket in the lower spherical bearing surface which is of such size in relation to the gyration of the head that a circumferential oil passage in the lower bearing surface of the head is always in opposition thereto. The oil which escapes to the sump P instead of passing to the gear case passes by way of the passage $P^1$ to the bearing for the shaft $B^5$ and thence flows to the main oil sump.

Oil is pumped upwardly between shaft and sleeve and between sleeve and bearing by the positive action of the pump. This upward pumping action is effected through the passage $F^2$ which admits oil to the chamber about the crank disc, whence it moves upwardly in response to the action of the pump and escapes to the gear case either through the ball bearing B¹ or over the top of the concentric sleeve. Since the passage F²⁰ is of substantially smaller cross sectional area than the passage F⁸ the division of oil thus effected is thus insufficient to affect the general lubricating action of the spherical bearing surfaces.

I claim:

1. The combination with a rotating sleeve and cylindrical bearing therefor of a pump and means interposed between the pump and the sleeve for rotating it responsive to the rotation of the sleeve, said means comprising a crank disc associated with the pump, an opening in the disc and a spring pressed plunger in the sleeve adapted to be thrown in the opening of the disc to drive it when the sleeve rotates.

2. In a crushing machine, a housing including a gear case having a circular top opening, a circular closure therefor having an upwardly extending bearing surface, the wall of the housing and the closure having lubricating passages formed therewithin, pins unequally spaced interposed between the closure and housing, one of said pins being hollow and adapted to complete the connection between said oil passages.

3. In a crushing machine, a bearing shaft, an eccentric mounted for rotation thereby to gyrate it, a bearing therefor, a cap closing the lower end of the bearing, an oil pump contained within the cap, and means interposed between the pump and the eccentric for driving the pump directly from the eccentric, comprising an apertured crank disc, a spring pressed drive pin mounted in the eccentric and adapted to be thrust by the spring into engagement with the aperture in the disc.

4. In a gyratory crusher, a crushing head having a spherical bearing surface, a support therefor, having a horizontally extended spherical bearing surface, said support being centrally apertured, a shaft depending from said head, a cylindrical bearing and a cylindrical, eccentrically apertured sleeve interposed between said bearing and said shaft, and means for rotating said sleeve, an oil sump and means for pumping oil therefrom upwardly to said spherical bearing surfaces, and upwardly between shaft and sleeve, and between sleeve and bearing, comprising a rotary pump, a crank disc therefor, an operative connection between said disc and said sleeve, a housing inclosing said disc and said operative connection, and an oiling duct leading therein from said pump, said duct being of substantially smaller cross sectional area than the cross sectional area of the duct leading to said spherical bearing surfaces.

5. In a gyratory crusher, a crushing head having a spherical bearing surface, a support therefor, having a horizontally extending spherical bearing surface, said support being centrally apertured, a shaft depending from said head, an eccentrically apertured sleeve positioned about said shaft, and a bearing therefor, means for rotating said sleeve, an oil reservoir, and means for pumping oil therefrom upwardly between bearing and sleeve and between sleeve and shaft, and upwardly to said spherical bearing surfaces, the lower spherical bearing surface being surrounded by an annular closed sump, the crushing head being adapted to seal the top of said sump, and a return connection between said sump and said oil reservoir.

6. In a gyratory crusher, a crushing head having a spherical bearing surface, a support therefor, having a horizontally extending spherical bearing surface, said support being centrally apertured, a shaft depending from said head, an eccentrically apertured sleeve positioned about said shaft, and a bearing therefor, means for rotating said sleeve, comprising a gear mounted on said sleeve, a drive shaft and means for rotating it, and a pinion thereon in mesh with the gear on said sleeve, an oil reservoir, and means for pumping oil therefrom upwardly to said spherical bearing surfaces, the lower spherical bearing surface being surrounded by an annular closed sump, the crushing head being adapted to seal the top of said sump, and a return connection between said sump and said oil reservoir, adapted to lubricate the bearings of said drive shaft.

Signed at Chicago, county of Cook and State of Illinois, this 14th day of May, 1924.

EDGAR B. SYMONS.